United States Patent [19]

Filges et al.

[11] Patent Number: 5,268,417
[45] Date of Patent: Dec. 7, 1993

[54] AQUEOUS SYNTHETIC RESIN PREPARATION CAPABLE OF CROSS-LINKING AT ROOM TEMPERATURE AND THE USE THEREOF AS A LAMINATING ADHESIVE

[75] Inventors: Ulrich Filges, Limburgerhof; Karl Haeberle, Neustadt; Lothar Maempel, Bruehl; Oral Aydin, Mannheim; Gerhard Bauer, Weinheim, all of Fed. Rep. of Germany

[73] Assignee: BASF Aktiengesellschaft, Ludwigshafen, Fed. Rep. of Germany

[21] Appl. No.: 903,957

[22] Filed: Jun. 26, 1992

[51] Int. Cl.$^5$ .............. C08K 5/29; C08F 216/34; C08F 216/36; C08F 220/10

[52] U.S. Cl. .................. 524/714; 526/315; 526/316; 526/319; 526/328; 526/341; 526/344; 526/348; 526/303.1

[58] Field of Search ......................... 524/714

[56] References Cited

U.S. PATENT DOCUMENTS

| | | | |
|---|---|---|---|
| 4,230,772 | 10/1980 | Swift et al. | 428/442 |
| 4,806,585 | 2/1989 | Nakayama et al. | 524/376 |
| 4,886,852 | 12/1989 | Numa | 524/458 |
| 4,888,383 | 12/1989 | Huybrechts | 524/832 |

FOREIGN PATENT DOCUMENTS

| | | |
|---|---|---|
| 2817607 | 10/1978 | Fed. Rep. of Germany . |
| 934385 | 8/1963 | United Kingdom . |

*Primary Examiner*—Joseph L. Schofer
*Assistant Examiner*—Wu C. Cheng
*Attorney, Agent, or Firm*—Oblon, Spivak, McClelland, Maier & Neustadt

[57] ABSTRACT

Aqueous dispersions of a copolymer obtained by free-radical polymerization and containing from 0.01 to 40% w/w of polymerized units of comonomers having at least one aldehyde or keto group, which dispersions contain at least one polyisocyanate in which the isocyanate groups are blocked by oximes.

11 Claims, No Drawings

AQUEOUS SYNTHETIC RESIN PREPARATION CAPABLE OF CROSS-LINKING AT ROOM TEMPERATURE AND THE USE THEREOF AS A LAMINATING ADHESIVE

The invention relates to an aqueous dispersion of a copolymer obtained by free-radical polymerization and containing from 0.01 to 40% w/w of polymerized comonomer units having at least one aldehyde or keto group, which dispersion contains at least one polyisocyanate in which the isocyanate groups are blocked by an oxime.

Laminating adhesives are used, for example, for making composite films used for wrapping foodstuffs. By laminating together films of different materials it is possible to combine the properties of the materials.

The purpose of this may be to achieve particularly decorative effects or to attain technical effects, for example to protect a printed surface, to produce a boil-proof composite film, to prevent vapor diffusion, to produce heat-sealable composite structures, to eliminate all porosity, or to attain resistance to aggressive substances. The film materials mostly used are polyethylene, polypropylene, particularly biaxially orientated polypropylene, polyamide, polyester, PVC, polyvinyl acetate, Cellophane, and metals such as tin and aluminum.

The laminating adhesives normally used are, for example, binding agents which have been dissolved in organic solvent, or binder systems which cross-link due to the reaction of polyisocyanate compounds with polyesters or polyethers carrying hydroxy groups or the action of water on polyisocyanate compounds.

The solvent commonly used are gasoline, toluene, acetone, and ethyl acetate. However, the use of such solvents for the production of laminating adhesives is problematic and involves the use of costly equipment, since it is necessary to employ explosion-proof coating plants on account of the high degree of inflammability of these solvents, and equipment for the recovery of the solvents is required. Also residual solvent in the laminates spoils the taste and aroma of goods packed therein.

Moreover, these systems are generally two-component systems, since the reactive components are mixed shortly before use to avoid premature cross-linking.

DE-A 3,521,618 discloses aqueous adhesive compositions consisting of a dispersion of a polyisocyanate in water which is added to an aqueous dispersion of a copolymer, obtained by free-radical polymerization, to act as cross-linking agent. Similar preparations are described in U.S. Pat. No. 4,396,738 and DE-A 3,112,117.

A disadvantage of these aqueous preparations, however, is their poor stability on storage. For this reason, the polyisocyanate to be used as cross-linking agent may be dispersed in water and mixed with the copolymer only shortly before use.

The stability may be improved by reacting the isocyanate groups with blocking agents such as oximes, caprolactam, phenols, and dialkyl maleates. The resulting "blocked" polyisocyanates hydrolyze only slightly in aqueous dispersion.

DE-A 3,807,555 relates to such an oxime-blocked diisocyanate dispersed in water and suitable for use as an additive to polymers dispersed in water.

However, cross-linking reactions occur after the blocking agent is released from the polyisocyanate at temperatures around 130° C.

Thus the prior art aqueous adhesive compositions containing polyisocyanates as cross-linking agent are either unstable and can only be used in the form of two-component systems or they undergo cross-linking only at elevated temperatures. In the latter case, the compositions are frequently unsuitable for use as laminating adhesives because the plastics materials to be laminated, for example, may not be subjected to elevated temperatures for any undue length of time.

It is thus an object of the invention to provide aqueous adhesive compositions which are stable on storage and which cross-link at room temperature.

Accordingly, we have found the aqueous dispersions defined above, their manufacture, their use as adhesives, substrates coated therewith, and composite films and high-gloss composites made using said aqueous dispersions.

The aqueous dispersions contain a copolymer having keto or aldehyde groups and an oxime-blocked polyisocyanate. These dispersions are, surprisingly, stable on storage and capable of cross-linking at room temperature. Cross-linking possibly occurs according to the following pattern:

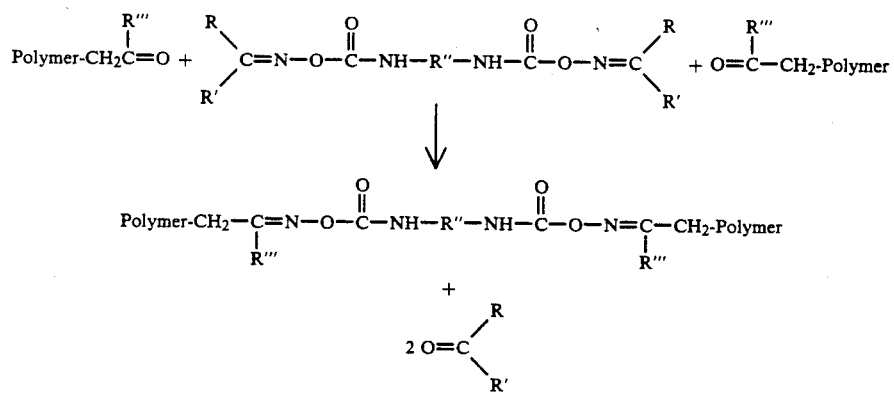

Cross-linking occurring as indicated above is brought about by transoximation.

The following remarks relate to the constituents of the dispersions of the invention and to methods of manufacturing and using the same.

The aqueous dispersions of the invention contain a copolymer obtained by free-radical polymerization and containing, to an extent of from 0.01 to 40% w/w and preferably from 0.1 to 20% w/w and more preferably from 0.5 to 10% w/w, a comonomer (a) having at least one aldehyde or keto group. This comonomer is preferably one having one or two aldehyde groups or one or two keto groups, or one aldehyde group and one keto group, and an olefinic double bond which is capable of undergoing free-radical polymerization.

Examples of suitable comonomers (a) are acrolein, methacrolein, vinyl alkyl ketones having from 1 to 20, preferably from 1 to 10, carbon atoms in the alkyl moiety, formyl styrene, alkyl (meth)acrylates having one or two keto or aldehyde groups or one aldehyde group and one keto group in the alkyl moiety, which alkyl radical preferably contains a total of from 3 to 10 carbon atoms, e.g. (meth)acryloxy alkyl propanals such as are described in DE-A 2,722,097. Also suitable are N-oxoalkyl (meth)acrylamides such as are disclosed in U.S. Pat. No. 4,226,007, DE-A 2,061,213, and DE-A 2,207,209.

Particularly preferred comonomers (a) are acetoacetyl (meth)acrylate, acetoacetoxyethyl (meth)acrylate, and especially diacetone arcylamide.

The monomers (b) are present in the copolymer to an extent of from 60 to 99.99% w/w, preferably from 80 to 99.99% w/w and more preferably from 90 to 99.5% w/w, based on the copolymer.

Suitable monomers (b) are esters of acrylic and methacrylic acids with $C_1$-$C_{20}$-alkylalcohols. Examples of suitable alcohols are methanol, ethanol, n-propanol, isopropanol, n-, s-, and t-butanols, n-pentanol, isoamylalcohols, n-hexanol, octanol, 2-ethylhexanol, laurylalcohol, and stearyalcohol.

Good results are obtained using alkyl (meth)acrylates having a $C_1$-$C_{10}$-alkyl radical, e.g. methyl methacrylate, methyl acrylate, n-butyl acrylate, ethyl acrylate, and 2-ethylhexyl acrylate.

Mixtures of said alkyl (meth)acrylates are also very suitable.

Other suitable monomers (b) are vinyl esters of carboxylic acids containing from 1 to 20 carbon atoms, e.g. vinyl laurate, vinyl stearate, vinyl propionate, and vinyl acetate.

Examples of vinylaromatic compounds are vinyl toluene, α-styrene, β-styrene, α-butyl styrene, 4-n-butyl styrene, 4-n-decyl styrene, and, preferably, styrene. Examples of nitriles are acrylonitrile and methacrylonitrile.

The vinyl halides are ethylenically unsaturated compounds substituted by chlorine, fluorine, or bromine, preferably vinyl chloride and vinylidene chloride.

Examples of suitable non-aromatic hydrocarbons of from 2 to 8 carbon atoms and containing at least two, in particular two, olefinic double bonds are butadiene, isoprene, and chloroprene.

The monomers (b) may be used in the form of mixtures, if desired.

Other suitable copolymerizable monomers (c), i.e. monomers not included in the groups (a) and (b), are the following:

Esters of acrylic and methacrylic acids with alcohols of from 1 to 20 carbon atoms and containing at least one hetero atom in addition to the oxygen atom in the alcohol group and/or containing an aliphatic or aromatic ring.

Examples of such compounds are 2-ethoxyethyl acrylate, 2-butoxyethyl (meth)acrylate, dimethylaminoethyl (meth)acrylate, diethylaminoethyl (meth)acrylate, aryl, alkaryl, and cycloalkyl esters of acrylic and methacrylic acids, such as cyclohexyl (meth)acrylate, phenylethyl (meth)acrylate, phenylpropyl (meth)acrylate, and (meth)acrylates of heterocyclic alcohols such as furfuryl (meth)acrylate.

Examples of further comonomers are (meth)acrylamide and derivatives thereof which are substituted on the nitrogen atom by $C_1$-$C_4$-alkyl.

Particularly important comonomers are hydroxyfunctional compounds, for example $C_1$-$C_{15}$-alkyl (meth)acrylates substituted by one or two hydroxy groups. Of these hydroxy-functional comonomers, the following are particularly significant: hydroxy($C_1$-$C_8$-alkyl) (meth)acrylates such as n-hydroxyethyl, n-hydroxypropyl, and n-hydroxybutyl (meth)acrylates.

The co-use of comonomers containing salt-forming groups is recommended for the preparation of self-dispersing copolymers suitable, for example, for the formation of aqueous secondary dispersions. Prominent examples of comonomers containing salt-forming groups are itaconic acid, acrylic acid, and methacrylic acid.

The content of said other comonomers in the copolymer may be from 0 to 39.99% w/w, preferably from 0 to 19.9% w/w, and more preferably from 0 to 9.5% w/w.

The copolymer is produced by free-radical polymerization. Suitable polymerization methods, such as polymerization in substance or in solution, and suspension and emulsion polymerizations, are known to the person skilled in the art.

The copolymer is preferably produced by polymerization in solution followed by dispersion in water or, more preferably, by emulsion polymerization.

In the case of an emulsion polymerization, the comonomers may be polymerized as usual in the presence of a water-soluble initiator and an emulsifier at a temperature of from 30° to 95° C.

Suitable initiators are, for example, sodium, potassium, and ammonium persulfates, t-butyl hydroperoxides, water-soluble azo compounds, or, alternatively, redox initiators.

Examples of suitable emulsifiers are alkali metal salts of relatively long-chain fatty acids, alkyl sulfates, alkyl sulfonates, alkylated aryl sulfonates and alkylated diphenyl ether sulfonates.

Other suitable emulsifiers are the reaction products of alkylene oxides, particularly ethylene oxide or propylene oxide, with fatty alcohols or fatty acids, phenol, or alkyl phenols.

In the case of aqueous secondary dispersions, the copolymer is produced by solution polymerization in an organic solvent and then dispersed in water without the use of an emulsifier or dispersing agent but with the addition of a salt-forming substance, for example ammonia in the case of a copolymer which contains carboxylic groups. The organic solvent can be distilled off. The preparation of aqueous secondary dispersions is known to the person skilled in the art and is described, for example, in DE-A 3,720,860.

To regulate the molecular weight, modifiers may be used during polymerization. Examples of suitable modifiers may be used during polymerization. Examples of suitable modifiers are compounds containing a terminal SH group, such as mercaptoethanol, mercaptopropanol, thiophenol, thioglycerol, ethyl thioglycolate, methyl thioglycolate, and t-dodecylmercaptan.

Advantageously, specific amounts of specific comonomers are used so as to give a copolymer which has a glass transition temperature preferably between −60° and +140° C., more preferably between −30° and +80° C., and most preferably between −30° and +20°

C. The glass transition temperature of the copolymer can be determined by usual methods such as differential thermal analysis or differential scanning calorimetry (cf., for example, ASTM 3418/82—"midpoint temperature").

The aqueous dispersion of the invention contains, besides the copolymer obtained by free-radical polymerization, at least one polyisocyanate in which the isocyanate groups are blocked by an oxime.

The weight of oxime-blocked polyisocyanate is preferably from 0.01 to 30% w/w, more preferably from 0.1 to 20% w/w, and most preferably from 0.5 to 10% w/w, based on the weight of the copolymer produced by free-radical polymerization.

Suitable polyisocyanates are aromatic polyisocyanates but more preferably aliphatic and cycloaliphatic polyisocyanates.

The molecular weight of the polyisocyanates is preferably between 100 and 10,000 g/mole.

Examples of suitable polyisocyanates are diisocyanates such as tetramethylene diisocyanate, hexamethylene diisocyanate (HDI), dodecamethylene diisocyanate, 1,4-diisocyanatocyclohexane, 4,4'-di(isocyanatocyclohexyl)methane (HMDI), trimethylhexane diisocyanate, 1-isocyanato-3,3,5-trimethyl-5-isocyanatocyclohexane (IPDI), 2,4- and 2,6-diisocyanatotoluenes (TDI), tetramethylxylylene diisocyanate, p-xylylene diisocyanate, 2,4'- and 4,4'-diisocyanatodiphenylmethanes, and polyisocyanates containing, for example, isocyanurate or biuret groups, particularly those based on 1,6-diisocyanatohexane and/or 1-isocyanato-3,35-trimethyl-5-isocyanatomethylcyclohexane, or reaction products of polyisocyanates with polyhydric, especially dihydric to pentahydric, alcohols. Aliphatic alcohols having a total of from 2 to 8 carbon atoms, for example ethylene glycol, butane-1,4-diol, propane-1,2-diol, glycerol, trimethylolpropane, and pentaerythritol, are preferred.

Also suitable are polyisocyanates which have been rendered hydrophilic and are thus self-dispersing in water. This makes the use of emulsifiers or dispersing agents substantially superfluous when creating a dispersion. Self-dispersing polyisocyanates have been disclosed which contain non-ionic groups. These are, in particular, reaction products of polyisocyanates with polyalkylene ether alcohols as described, for example, in EP-A 206,059. The inclusion of ionic groups or groups capable of conversion to ionic groups can make polyisocyanates self-dispersing. The latter are disclosed, for example, in EP-A 312,836 or DE-A 2,708,611.

The isocyanate groups of the polyisocyanate are blocked by an oxime to an extent of preferably at least 50%, more preferably at least 80%, and most preferably at least 95%.

It is especially desirable for virtually all of the isocyanate groups of the polyisocyanate to be blocked by an oxime.

Oximes suitable for this purpose are those of aliphatic, cycloaliphatic, or aromatic aldehydes or ketones, for example acetoxime, methylethyl ketoxime, diethyl ketoxime, methylisopropyl ketoxime, methylisobutyl ketoxime, diisopropyl ketoxime, cyclohexanoxime, 2-methyl cyclohexanoxime, 2,6-dimethyl cyclohexanoxime, acetophenoxime, benzophenoxime, and diethyl glyoxime. The preferred oximes are those of aliphatic ketones containing one keto group and a total of from 3 to 12 carbon atoms, especially acetoxime and methylethyl ketoxime.

The formation of the oxime-blocked polyisocyanates may be carried out in a manner known to the person skilled in the art in an inert organic solvent, e.g. an aromatic hydrocarbon such as toluene, at a temperature of from 20° to 150° C., preferably from 20° to 100° C.

The ratio of isocyanate groups in the polyisocyanate used to the oxime groups is preferably from 1:0.9 to 1:1.4 and more preferably from 1:0.95 to 1:1.1.

The blocking reaction may be advantageously carried out in the presence of a metal salt acting as catalyst, e.g. dibutyltin dilaurate or tin octoate.

The aqueous dispersions of the invention can contain the oxime-blocked polyisocyanates in dissolved or dispersed form. The dispersibility of the blocked polyisocyanates in water may be improved, if necessary, by adding dispersants or emulsifiers. Examples of suitable additives are the aforementioned emulsifiers normally used in emulsion polymerizations, or dispersants such as polyvinyl pyrrolidone and polyvinyl alcohols.

Reaction products of polyisocyanates with polyether alcohols, such as are described in EP-A 206,059, may also be used as emulsifiers. We prefer to use the reaction products of polyisocyanates with mono- to tri-hydric polyether alcohols, particularly monohydric polyether alcohols. The said polyether alcohols are, in particular, polyalkylene ether alcohols preferably containing from 10 to 70 $C_2$-$C_4$-alkylene oxide units, these preferably being ethylene oxide units. Polyalkylene ether alcohols containing two or more different alkylene oxide units preferably contain at least 60% of ethylene oxide units.

It is possible to carry out the preparation of both the emulsifier and the blocked polyisocyanate substantially in a single step by reacting all of the polyisocyanate with the polyether alcohol and the oxime in any order.

The preparation of the aqueous dispersion of the invention may be effected in a simple manner by adding the blocked polyisocyanate or a solution or dispersion thereof to an aqueous dispersion of the copolymer.

An alternative method is to dissolve the blocked polyisocyanate in the monomers of the copolymer, this being possible on account of the fact that it is generally readily soluble in organic solvents, and then to carry out the free-radical copolymerization in the presence of the blocked polyisocyanate. The monomer solutions can be continuously metered to the reaction mixture in the usual manner. Any emulsifier or dispersant necessary for dispersing the blocked polyisocyanate is added to the aqueous dispersion resulting from the emulsion polymerization of the monomers.

To the dispersions of the invention there may be added organic, preferably water-miscible solvents as auxiliary solvents, particularly for the blocked polyisocyanates. These may be recovered from the aqueous dispersion by distillation. When the blocked polyisocyanates are dissolved in the monomers there is very little need for an auxiliary solvent, not even when the solids content is high.

The aqueous dispersions of the invention are suitable for use as paints and coating compounds for various substrates having thermoplastic, wooden or metallic surfaces or for use on textiles, bonded fiber fabrics, leather, or paper. They are also useful as building aids, for example as adhesives, sealing compounds, binders, and the like.

The dispersions of the invention may contain conventional auxiliaries and additives, according to their intended use. Examples of suitable materials for this purpose are fillers such as quartz powder, quartz sand, microdispersed silicic acid, heavy spar, calcium carbonate, chalk, dolomite, or talcum, which are often used together with suitable wetting agents, for example polyphosphates such as sodium hexamethaphosphate, naphthalenesulfonic acid, ammonium polyacrylates, and sodium polyacrylates, the amount of wetting agent used being from 0.2 to 0.6% w/w, based on the filler.

Fungicides may also be added to the dispersions for preservation purposes. These are generally used in amounts ranging from 0.02 to 1% w/w, based on the dispersion. Examples of suitable fungicides are phenol derivatives and cresol derivatives or organic tin compounds.

The dispersions of the invention are also particularly suitable for use as sealing compounds and adhesive compounds, especially as laminating adhesives for the production of composite films and high-gloss composites. When used as such, the dispersions may also contain, in addition to the aforementioned additives, conventional auxiliaries and additives specific to adhesion technology. These include, for example, thickening agents, plasticizers, and possibly tackifying resins such as natural resins, or modified resins, eg colophonium esters, or synthetic resins, eg phthalate resins.

Dispersions which are intended for use as laminating adhesives contain, in particular, alkyl (meth)acrylates as comonomer b).

The pH of the dispersion is preferably adjusted to a value between 2 and 7, as the cross-linking reaction of the blocked polyisocyanates with the copolymers can be catalyzed in acid medium.

The dispersions are stable on storage and cross-link at room temperature. In order to produce composite films and high-gloss composites, the dispersion is applied to the substrate, eg to a polymeric film or to card(board) (in the case of high-gloss composites). Cross-linking occurs as the water evaporates at room temperature. By increasing the temperature to, say, from 30° to 100° C., it is possible to accelerate evaporation of the water. The film or card thus coated can then be laminated.

Alternatively, it is possible, in principle, to coat the substrate separately with a dispersion of the copolymer and with the blocked polyisocyanate or dispersion or solution thereof, such that the dispersion of the invention is formed in situ, ie on the surface of the substrate. Specifically, the surface of the substrate may be first coated with an oxime-blocked polyisocyanate or solution or dispersion thereof and then, in a separate operation at some later stage, with an aqueous dispersion of a copolymer which has been formed by free-radical polymerization and which contains from 0.01 to 40% w/w of polymerized units of comonomers containing at least one aldehyde or keto group.

EXAMPLES I

Copolymer dispersions and polyisocyanate dispersions were prepared separately and then mixed together, after which the properties of the blends were measured.

Preparation of the Copolymer Dispersions

Copolymer Dispersion 1

200 g of demineralized water were placed in a stirred reaction vessel, and 37 g of feed 1 (see below) and 20 g of feed 2 were placed in separate feed vessels connected to said reaction vessel, the whole being heated to 80° C. After 15 minutes at this temperature feeding of the two streams to the reaction vessel at constant rates was commenced. It took 2 hours for feed 1 to drain into the vessel and 2.5 hours for feed 2. On completion of the feed of initiator (feed 2), the dispersion was stirred for a further hour at 85° C.

Feed 1: (this feed was stirred during polymerization)
107.5 g of demineralized water
400 g of ethyl acrylate
90 g of methyl methacrylate
50 g of a 20% w/w aqueous diacetone acrylamide solution
50 g of a 20% w/w solution of the sodium salt of p-dodecyldiphenyl ether sulfonate in water (emulsifier)
50 g of a 20% w/w solution of the reaction product of p-isononylphenol with approximately 50 moles of ethylene oxide in water (emulsifier)

Feed 2:
100 g of demineralizer water
3 g of sodium persulfate

Copolymer dispersions 2 to 13 were prepared in a similar manner (Table 1).

TABLE 1

Composition of the Copolymers in Percent by Weight

| Copolymer dispersion | EA | nBA | MMA | HEA | DAA | AAEM |
|---|---|---|---|---|---|---|
| 1 | 80 | — | 18 | — | 2 | — |
| 2 | 99 | — | — | — | 1 | — |
| 3 | 96 | — | — | — | 4 | — |
| 4 (for comparison) | 80 | — | 18 | 2 | — | — |
| 5 (for comparison) | 100 | — | — | — | — | — |
| 6 | 77.7 | — | 17.4 | — | — | 4.9 |
| 7 | 66 | 14 | 18 | — | 2 | — |
| 8 | 98 | — | — | — | 2 | — |
| 9 (for comparison) | 77 | — | 18 | 5 | — | — |
| 10 (for comparison) | 68 | 14 | 18 | — | — | — |
| 11 | 99 | — | — | — | 1 | — |
| 12 (for comparison) | 99 | — | — | 1 | — | — |
| 13 | 96 | — | — | 2 | 2 | — |

EA: ethyl acrylate
nBA: n-butyl acrylate
MMA: methyl methacrylate
HEA: hydroxyethyl acrylate
DAA: diacetone acrylamide
AAEM: acetoacetoxyethyl methacrylate

Production of Polyisocyanate Preparations

Butanoxime-blocked polyisocyanate 1 (P1)

1,000 g of a trimerized hexamethylene diisocyanate containing isocyanurate groups (Basonat ® PLR 8638, BASF AG) and having an isocyanate content of 22.6% were placed in a stirred vessel having a capacity of 2 l and purged with nitrogen, and were heated to 80° C. 1.16 g of benzoyl chloride, 0.5 g of dibutyltin dilaurate, and 160.6 g of a reaction product of 2 moles of propylene oxide with methoxypolyethylene glycol (component A; 11 ethylene oxide units; OH number 110) were added with stirring over a period of 3 minutes. After 3 hours, the colorless reaction product was filtered off. It had a viscosity of 1,600 mPa.s at 25° C. and a content of NCO radicals of 18.2%. 378 g of 2-butanoxime were added to 1,000 g of this polyisocyanate preparation at 80° C. and the mixture was stirred for 3 hours at 80° C.

Butanoxime-blocked polyisocyanate 2 (P2)

1,000 g of a trimerized hexamethylene diisocyanate (Basonat ® PLR 6638, BASF AG) having an isocyanate content of 22.6% were placed in a stirred vessel having a capacity of 2 l and purged with nitrogen, and were heated to 80° C. Component A (11 ethylene oxide units; OH number 110) was added over a period of 3 minutes. Following a period of 2 hours at this temperature, the reaction product was filtered off. The product had an NCO content of 19.1% and a viscosity of 1,450 mPa.s at 25° C. 397 g of 2-butanoxime were added to 1,000 g of this polyisocyanate preparation at 80° C., and the mixture was stirred for 3 hours at 80° C.

Butanoxime-blocked polyisocyanate 3 (P3)

1,000 g of a trimerized hexamethylene diisocyanate (Basonat® PLR 8638, BASF AG) having an isocyanate content of 22.6% were placed in a stirred vessel having a capacity of 2 l and purged with nitrogen, and were heated to 80° C. Component A was added over a period of 3 minutes. Following a period of 3 hours at this temperature, the reaction product was filtered off. The product had an NCO content of 19.1% and a viscosity of 1,450 mPa.s at 25° C. 397 g of 2-butanoxime in 100 g of anhydrous toluene were added to 1,000 g of this polyisocyanate preparation at 80° C., and the mixture was stirred for 6 hours at 80° C.

Acetoxime-blocked polyisocyanate 4 (P4)

1,000 g of a biuret of hexamethylene diisocyanate (Basonat® PLR 8401, BASF AG) having an isocyanate content of 22.4% were placed in a stirred vessel having a capacity of 2 l and purged with nitrogen, and were heated to 80° C. Component A (see above) was added over a period of 3 minutes. Following a period of 2 hours at this temperature, the reaction product was filtered off. The clear liquid had a viscosity of 6,000 mPa.s at 25° C. and an NCO content of 19.1%. 333 g of acetoxime in 150 g of anhydrous acetone were added to 1,000 g of this polyisocyanate preparation at 60° C., and the mixture was stirred for 6 hours at 60° C.

Butanoxime-blocked polyisocyanate 5 (P5)

34.2 g of isophorone diisocyanate were added to 150 g of methylpolyethylene glycol (molecular weight 500) at 100° C. in a stirred vessel having a capacity of 1 l and purged with nitrogen, and the mixture was stirred at this temperature for 2 hours. 220 g of butanoxime were added dropwise at 50° C. over a period of 2 hours, and the mixture was kept at this temperature for a further 2 hours. 200 g of this reaction product were mixed with 25 g of toluene.

The solids contents of the emulsions of blocked polyisocyanate were in each case adjusted to 25% w/w.

Shelf-life test

Mixtures of the above ketoxime-blocked polyisocyanates P1 to P5 with copolymer dispersions 1 were unchanged after storage at room temperature for 3 days.

Test for Cross-linking Capacity

The following amounts of a 25% w/w aqueous emulsion comprising 25 g of blocked polyisocyanate P5 and 75 g of water were added to 50 g of dispersion 2 and also to 50 g of dispersion 8:

TABLE 2 Composition of the Mixtures a) 50 g of dispersion 2 and 0.5 g of emulsion
b) 50 g of dispersion 2 and 1.0 g of emulsion
c) 50 g of dispersion 2 and 2.0 g of emulsion
d) 50 g of dispersion 2 and 0.0 g of emulsion
e) 50 g of dispersion 8 and 0.5 g of emulsion
f) 50 g of dispersion 8 and 1.0 g of emulsion
g) 50 g of dispersion 8 and 2.0 g of emulsion
h) 50 g of dispersion 8 and 0.0 g of emulsion
i) 50 g of comparative dispersion 5 and 0.5 g of emulsion
j) 50 g of comparative dispersion 10 and 0.5 g of emulsion Films were prepared from these dispersion mixtures and then dried for a week at room temperature. The extent to which the resulting films swelled when immersed in toluene and DMF was taken as a measure of the degree of cross-linking attained in the films. To this end, approximately 1 g of test film was soaked in toluene and DMF for 2 days, after which the percent solvent take-up was measured.

TABLE 3

|    | Solvent Take-up in % | |
|----|---------|---------|
|    | Toluene | DMF |
| a) | 1845% | 1790% |
| b) | 1440% | 1395% |
| c) | 1100% | 1105% |
| d) | no cross-linking (polymer dissolves) | |
| e) | 1790% | 1870% |
| f) | 1230% | 1250% |
| g) | 830% | 900% |
| h) | no cross-linking (polymer dissolves) | |
| i) | no cross-linking (polymer dissolves) | |
| j) | no cross-linking (polymer dissolves) | |

Application Technology Tests

Method of Making the Composite Films

Into each of the copolymer dispersions 1 to 3 and 6 to 7 there were stirred 3% w/w (based on the copolymer dispersion) of the emulsion of emulsifiable blocked polyisocyanate (P1) to form a homogeneous mixture. The resulting preparation were then knife-coated on to films or foils of various materials and heated at 50° C. The dry thickness of the coatings was 3g/m² and the films coated were as follows: polyethylene terephthalate PETP; polyamide PA; polyvinyl chloride PVC; polypropylene (following corona discharge pre-treatment) PP; and aluminum Alu. The coated films and foils were laminated, 20 seconds later, with a film of polyethylene (which had been subjected to corona discharge pre-treatment). The composites were then stored at room temperature and standard atmospheric conditions for 7 days before being cut up into strips 2 cm wide. The strips were then delaminated at 23° C. by pulling the top layer from the substrate at an angle of 180° and a rate of 100 m/min. The peeling force, in N, required for said 2 cm wide strips was measured.

Method of Making High-gloss Composites

Into each of the copolymer dispersions 11 to 13 there was stirred 4% w/w of the emulsion of blocked polyisocyanate (P1). This preparation was then knife-coated on to offset-printed cardboard at such a rate as to give a dry layer thickness of 5 g/m². 30 seconds after this application, the cardboard was laminated with biaxially orientated polypropylene film (o-PP) or acetate film.

Tests were carried out (immediately after lamination and after an interim period of 7 days) to determine whether paper fibers or portions of the printed ink layer were removed from the surface of the substrate during delamination and whether the top layer showed areas of detachment from the substrate near grooves (imprinted areas) of the latter (groove stability immediately after lamination and 6 weeks later).

TABLE 4

Peeling Resistance in N/cm of Composites after 7 Days

| | PETP/PE | PA/PE | PVC/PE | PP/PE | Alu/PE |
|---|---|---|---|---|---|
| Dispersion 1 + 3% of polyisocyanate 1 | 3.0 | 3.0 | 3.2 | 2.5 | — |
| Dispersion 1 alone | 1.4 | 1.8 | 1.0 | 0.8 | — |
| Dispersion 2 + 3% of polyisocyanate 1 | 2.9 | 3.0 | 3.3 | 2.5 | — |
| Dispersion 2 alone | 1.2 | 1.3 | 1.5 | 0.9 | — |
| Dispersion 3 + 3% of polyisocyanate 1 | 3.0 | 2.5 | 3.1 | 2.8 | — |
| Dispersion 6 + 3% of polyisocyanate 1 | 2.5 | 3.0 | 2.4 | 2.5 | 2.1 |
| Dispersion 7 + 3% of polyisocyanate 1 | 2.1 | 2.8 | 2.0 | 1.8 | 1.8 |

TABLE 5

Peel Test on High-gloss Composites

| | Dispersion containing $3\beta\%$ $\beta$w/w of P1 | | | Dispersion containing $0\beta\%$ of P1 | | |
|---|---|---|---|---|---|---|
| | 11 | 12 | 13 | 11 | 12 | 13 |
| o-PP Film: | | | | | | |
| no wait | 1 | 1 | 1 | 2 | 2 | 2 |
| 7 days' wait | 1 | 1 | 1 | 2 | 2 | 2 |
| Acetate Film: | | | | | | |
| no wait | 1 | 1 | 1 | 2 | 2 | 2 |
| 7 days' wait | 1 | 1 | 1 | 2 | 2 | 2 |

Rating 1: complete detachment of paper fibers or ink
Rating 2: partial detachment of paper fibers of ink

TABLE 6

Groove Stability of High-gloss Composites

| | Dispersion containing $3\beta\%$ $\beta$w/w of P1 | | | Dispersion containing $0\beta\%$ of P1 | | |
|---|---|---|---|---|---|---|
| | 11 | 12 | 13 | 11 | 12 | 13 |
| o-PP Film: | | | | | | |
| no wait | + | + | + | — | — | — |
| 6 weeks' wait | + | — | + | — | — | — |
| Acetate Film: | | | | | | |
| no wait | + | + | + | — | — | — |
| 6 weeks' wait | — | — | + | — | — | — |

Rating +: no detachment from substrate in groove areas
Rating —: detachment from substrate in groove areas

EXAMPLES II

Preparation of Copolymer Dispersions in the Presence of Oxime-blocked Polyisocyanates P6 Reaction product of 1 mole of hexamethylene diisocyanate with 2 moles of acetoxime.

P7 Reaction product of 1 mole of isophorone diisocyanate with 2 moles of butanoxime.

P8 Reaction product of 300 g of 1,3,5-tris(6-isocyanatohexyl)-2m4m6-trioxohexahydro-1,3,5-triazine (Basonat® PLR 8638, BASF AG) having an isocyanate content of 22% with 138 g of butanoxime.

P9 Reaction product of 300 g of bis(6-isocyanatohexylaminocarbonyl)-(6-isocyanatohexyl)amine (Basonat® PLR 8401) having an isocyanate content of 22% with 138 g of butanoxime.

Preparation of Copolymer Dispersions

Copolymer Dispersion 14

262 g of demineralized water were placed in a stirred reaction vessel and 35 g of feed 1 (see below) and 20 g of feed 2 were placed in feed vessels connected to said reaction vessel, the whole being heated to 85° C. Following a period of 15 minutes, constant feeding of the two streams was commenced. Feed 1 took 2 hours, and feed 2 2.5 hours, to drain into the reaction vessel. On completion of the addition of initiator (feed 2), the dispersion was stirred for another hour at 85° C.

Feed 1 (this feed was stirred during polymerization)
75 g of demineralized water
500 g of monomer solution comprising
    407 g of ethyl acrylate
    90 g of methyl methacrylate
    3 g of P8
13 g of a 20% w/w aqueous solution of diacetone acrylamide
50 g of a 20% w/w solution of the sodium salt of p-dodecyldiphenyl ether disulfonate in water
50 g of a 20% w/w solution of the reaction product of p-isononylphenol with 50 moles of ethylene oxide in water Feed 2
100 g of demineralized water
3 g of sodium persulfate Copolymer Dispersions 15 to 21

In the preparation of the remaining copolymer dispersions, only the monomers and the blocked polyisocyanate and the quantities thereof in feed 1 were changed; the emulsifier and the amount thereof remained the same.

Copolymer Dispersion 15

62 g of demineralized water
501 g of monomer solution comprising
    405 g of ethyl acrylate
    90 g of methyl methacrylate
    6 g of P8
25 g of 20% w/w aqueous diacetone acrylamide solution Copolymer Dispersion 16

50 g of demineralized water
502 g of monomer solution comprising
    403 g of ethyl acrylate
    90 g of methyl methacrylate
    9 g of P8
38 g of 20% w/w aqueous diacetone acrylamine solution Copolymer Dispersion 17

75 g of demineralized water
500.5 g of monomer solution comprising
    407.5 g of ethyl acrylate
    90 g of methyl methacrylate
    3 g of P7
12.5 g of 20% w/w aqueous diacetone acrylamide solution Copolymer Dispersion 18

62.5 g of demineralized water
501 g of monomer solution comprising
    405 g of ethyl acrylate
    90 g of methyl methacrylate
    6 g of P7
25 g of 20% w/w aqueous diacetone acrylamide solution Copolymer Dispersion 19

50 g of demineralized water
501.5 g of monomer solution comprising 402.5 g of ethyl acrylate
90 g of methyl methacrylate
9 g of P7
37.5 g of 20% w/w aqueous diacetone acrylamide solution Copolymer Dispersion 20

50 g of demineralized water
500 g of monomer solution comprising
   105 g of n-butyl acrylate
   300 g of ethyl acrylate
   90 g of acrylonitrile
   5 g of P6
1.9 g of acetoacetoxyethyl methacrylate Copolymer Dispersion 21

50 g of demineralized water
450 g of monomer solution comprising
   100 g of n-butyl acrylate
   290 g of ethyl acrylate
   50 g of acrylonitrile
   20 g of methyl acrylate
   10 g of hydroxyethyl acrylate
   10 g of P9
20 g of acetoacetoxyethyl methacrylate Comparative Dispersions 14a to 19a No blocked polyisocyanate was included in feed 1

Test for Cross-linking Capacity

The dispersions were converted to film at room temperature. This was done by pouring the dispersions into an appropriate silicone mold and allowing the water to evaporate at room temperature. The resulting films having a thickness of 1 mm were dried at room temperature for one week. The extent to which the films swelled when immersed in DMF, toluene, and acetone was taken as a measure of the degree of cross-linking attained therein. To this end, approximately 1 g of test film was soaked in DMF, toluene, and acetone respectively for 3 days, after which the percent solvent take-up was measured.

TABLE 7

| | Solvent Take-up in Percent | | |
|---|---|---|---|
| | DMF | Toluene | Acetone |
| Dispersion 14 | 1480 | 1523 | 1210 |
| Dispersion 15 | 987 | 1025 | 806 |
| Dispersion 16 | 766 | 788 | 651 |
| Dispersion 17 | 1551 | 1529 | 1255 |
| Dispersion 18 | 1129 | 1108 | 891 |
| Dispersion 19 | 886 | 838 | 727 |
| Comparative Dispersions | | | |
| Dispersion 14a | dissolved | dissolved | dissolved |
| Dispersion 15a | dissolved | dissolved | dissolved |
| Dispersion 16a | dissolved | dissolved | dissolved |
| Dispersion 17a | dissolved | dissolved | dissolved |
| Dispersion 18a | dissolved | dissolved | dissolved |
| Dispersion 19a | dissolved | dissolved | dissolved |

The films made from Dispersions 14a to 16a were not cross-linked and dissolved completely.

We claim:

1. An aqueous dispersion of a copolymer obtained by free-radical polymerization and containing from 0.01 to 40% w/w of polymerized comonomer units having at least one aldehyde or keto group, which dispersion contains at least one polyisocyanate in which the isocyanate groups are blocked by an oxime.

2. An aqueous dispersion as claimed in claim 1, wherein the copolymer obtained by free-radical polymerization has a glass transition temperature of from −60° to +140° C. and contains.
   a) from 0.01 to 40% w/w of at least one comonomer having at least one aldehyde or keto group,
   b) from 60 to 99.99% w/w of at least one of the following compounds:
      alkyl esters of (meth)acrylic acid having from 1 to 20 carbon atoms in the alkyl moiety,
      vinyl esters of a carboxylic acid having from 1 to 20 carbon atoms,
      vinyl aromatic compounds containing up to 20 carbon atoms,
      ethylenically unsaturated nitriles of from 3 to 6 carbon atoms,
      vinyl halides, and/or
      non-aromatic hydrocarbons having from 2 to 8 carbon atoms and at least two olefinic double bonds, and
   c) from 0 to 39.99% w/w of other copolymerizable monomers.

3. An aqueous dispersion as claimed in claim 1 or claim 2, wherein the oxime-blocked polyisocyanate is an aliphatic polyisocyanate containing from 2 to 6 isocyanate groups.

4. The aqueous dispersion of claim 2, wherein said comonomer having at least one aldehyde or keto group is selected from the group consisting of acrolein, methacrolein, vinyl alkyl ketones having from 1 to 20 carbon atoms in the alkyl moiety, formyl styrene, alkyl (meth)acrylates having one or two keto or aldehyde groups and from 3 to 10 carbon atoms in the alkyl moiety, and diacetone acrylamide.

5. The aqueous dispersion of claim 4, wherein said comonomer having at least one aldehyde or keto group is selected from the group consisting of vinyl alkyl ketones having from 1 to 10 carbon atoms in the alkyl moiety, acetoacetyl (meth)acrylate, acetoacetoxyethyl (meth)acrylate, and diacetone acrylamide.

6. The aqueous dispersion of claim 2, wherein said copolymer contains from 0.1 to 20% by weight of said comonomer having at least one aldehyde or keto group, from 80 to 99.9% by weight of said compound b), and from 0 to 19.9% by weight of said other copolymerizable monomer c), said other copolymerizable monomer c) being selected from the group consisting of 2-ethoxyethyl acrylate, 2-butoxyethyl (meth)acrylate, dimethylaminoethyl (meth)acrylate, diethylaminoethyl (meth)acrylate, cyclohexyl (meth)acrylate, phenylethyl (meth)acrylate, phenylpropyl (meth)acrylate, furfuryl (meth)acrylate, (meth)acrylamide, (meth)acrylamide substituted on the nitrogen atom by $C_1$-$C_4$-alkyl, and $C_1$-$C_{15}$-alkyl (meth)acrylates substituted by one or two hydroxy groups.

7. The aqueous dispersion of claim 6, wherein said copolymer contains from 0.5 to 10% by weight of comonomer having at least one aldehyde or keto group, from 90 to 99.5% by weight of compound b) and from 0 to 9.5% by weight of said other copolymerizable monomer c).

8. The aqueous dispersion of claim 1 or 2, wherein said copolymer is produced by emulsion polymerization.

9. The aqueous dispersion of claim 8, wherein said emulsion polymerization is conducted in the presence of a water-soluble initiator and an emulsifier at a temperature of from 30° to 95° C.

10. The aqueous dispersion of claim 1, wherein said oxime is selected from the group consisting of acetoxime, methylethyl ketoxime, diethyl ketoxime, methylisopropyl ketoxime, methylisobutyl ketoxime, diisopropyl ketoxime, cyclohexanoxime, 2-methyl cyclohexanoxime, 2,6-dimethyl cyclohexanoxime, acetophenoxime, benzophenoxime, and diethyl glyoxime.

11. The aqueous dispersion of claim 10, wherein said polyisocyanate in which the isocyanate groups are blocked by an oxime is prepared by reacting a polyisocyanate selected from the group consisting of tetramethylene diisocyanate, hexamethylene diisocyanate, dodecamethylene diisocyanate, 1,4-diisocyanatocyclohexane, 4,4'-di-(isocyanatocyclohexyl)methane, trimethylhexane diisocyanate, 1-isocyanato-3,3,5-trimethyl-5-isocyanatocyclohexane, 2,4-diisocyanatotoluene, 2,6-diisocyanatotoluene, tetramethylxylylene diisocyanate, p-xylylene diisocyanate, 2,4'-diisocyanatodiphenyl methane, 4,4'-diisocyanatodiphenyl methane and reaction products thereof with a polyhydric alcohol having from 2 to 8 carbon atoms and from 2 to 5 hydroxy groups or with a polyalkylene ether alcohol, with said oxime in an inert organic solvent at a temperature of from 20° to 150° C., wherein the ratio of isocyanate groups in said polyisocyanate to oxime groups is from 1:0.9 to 1:1.4.

* * * * *

UNITED STATES PATENT AND TRADEMARK OFFICE
CERTIFICATE OF CORRECTION

PATENT NO. : 5,268,417
DATED : December 7, 1993
INVENTOR(S) : Ulrich Filges et al.

It is certified that error appears in the above-indentified patent and that said Letters Patent is hereby corrected as shown below:

On the title page, Item [30],

The Foreign Application Priority Data should read:

--Jul. 3, 1991 [DE] Fed. Rep. of Germany......4121946--

Signed and Sealed this

Twenty-fourth Day of May, 1994

Attest:

BRUCE LEHMAN

*Attesting Officer*     *Commissioner of Patents and Trademarks*